UNITED STATES PATENT OFFICE.

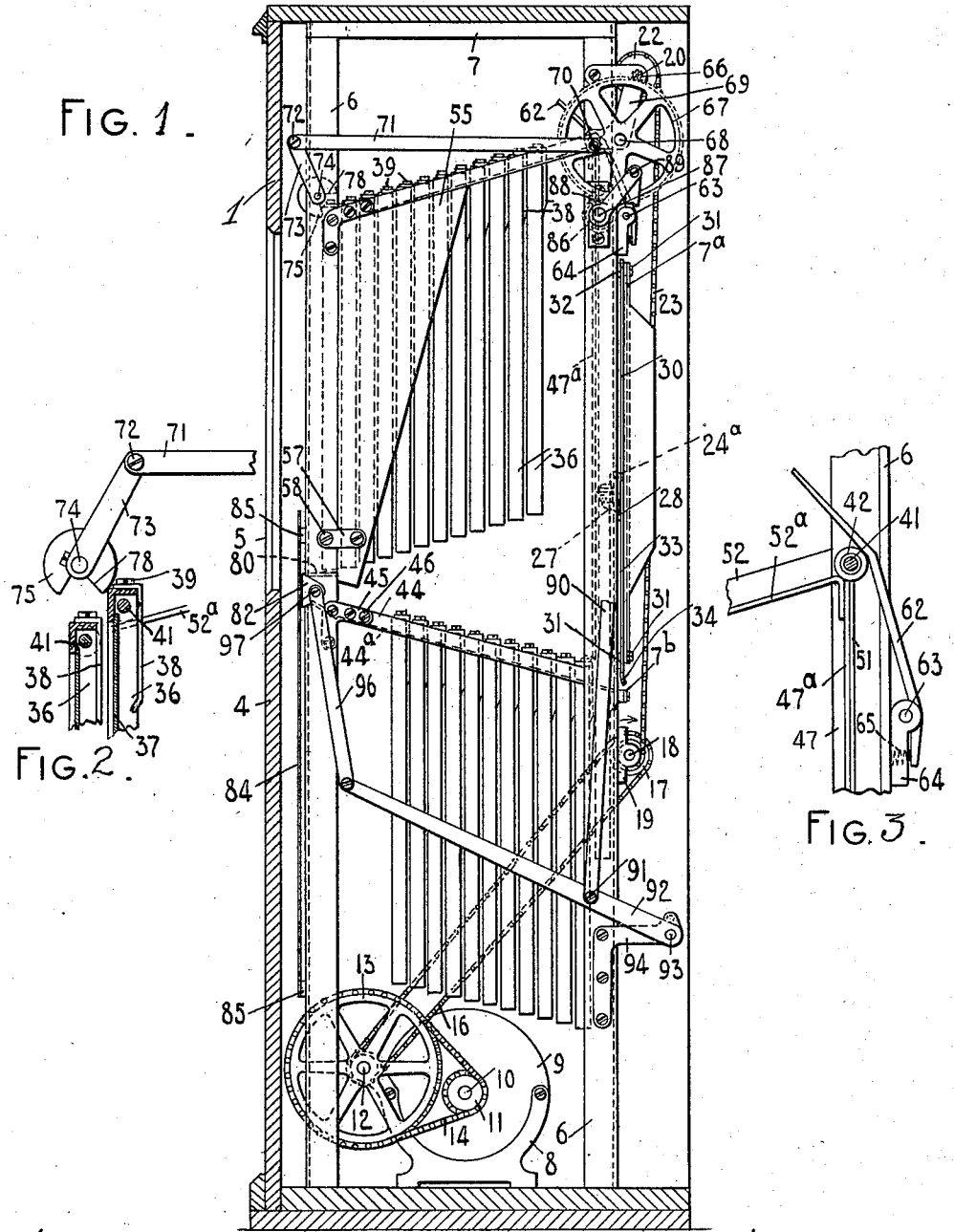

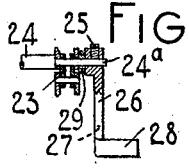

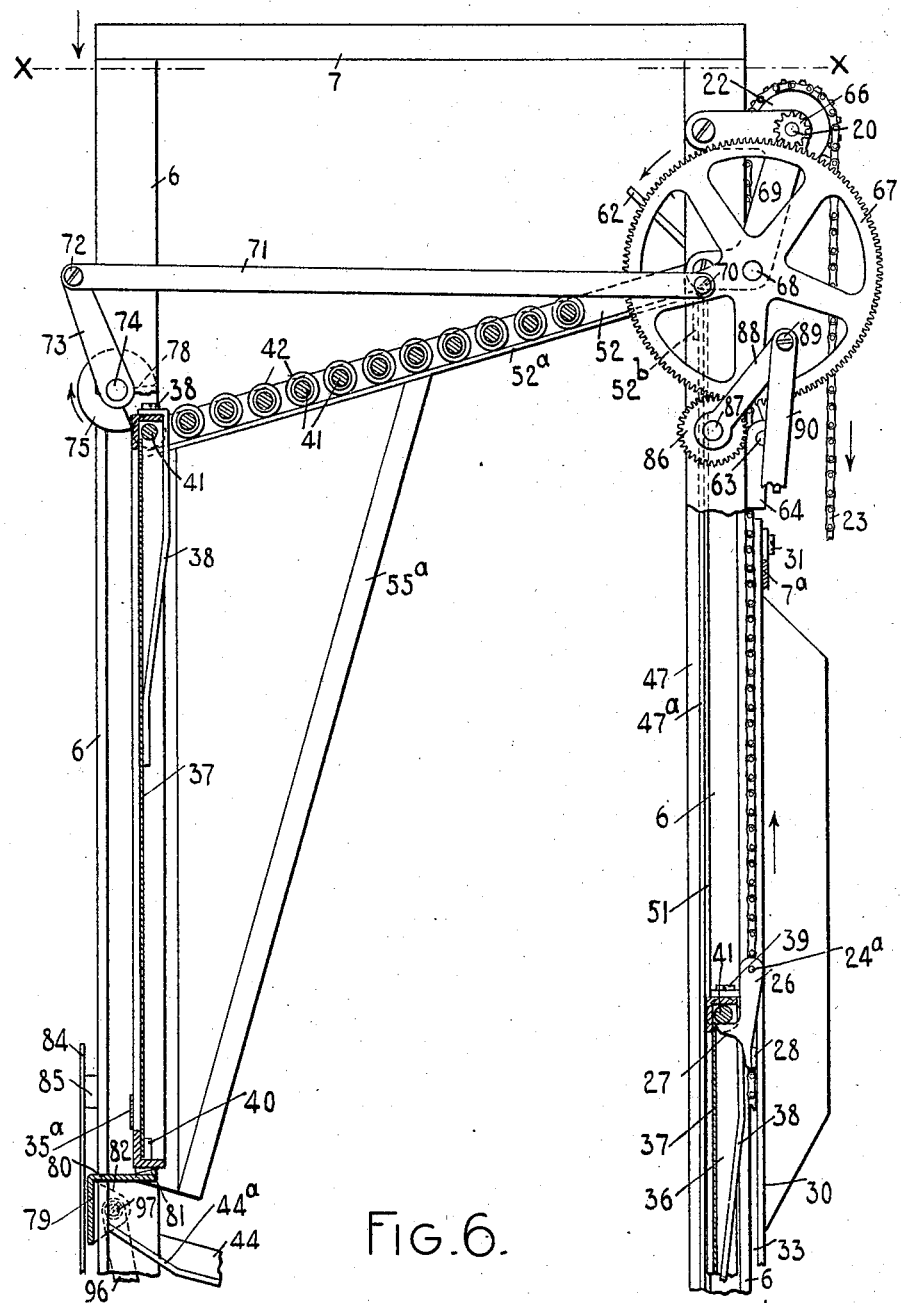

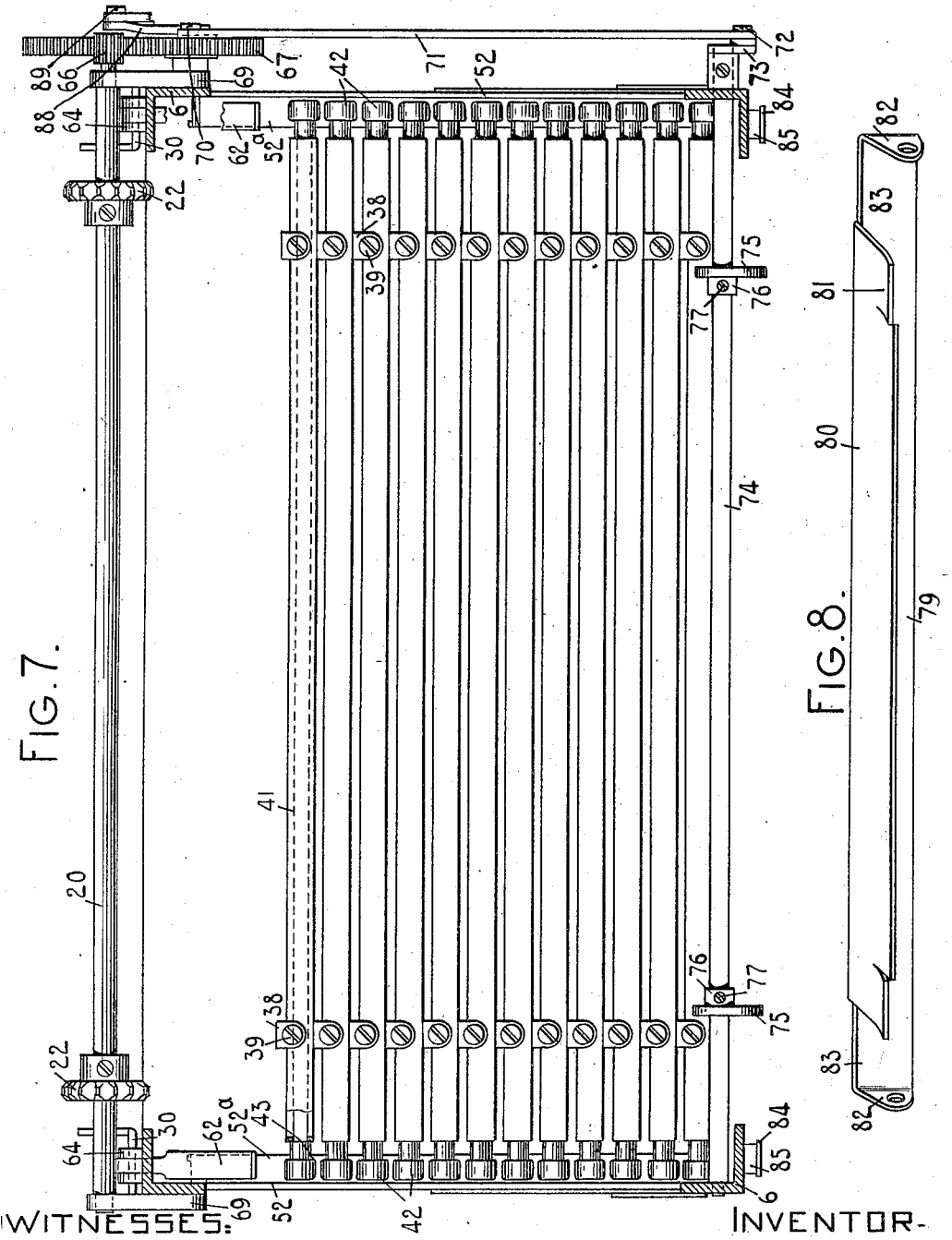

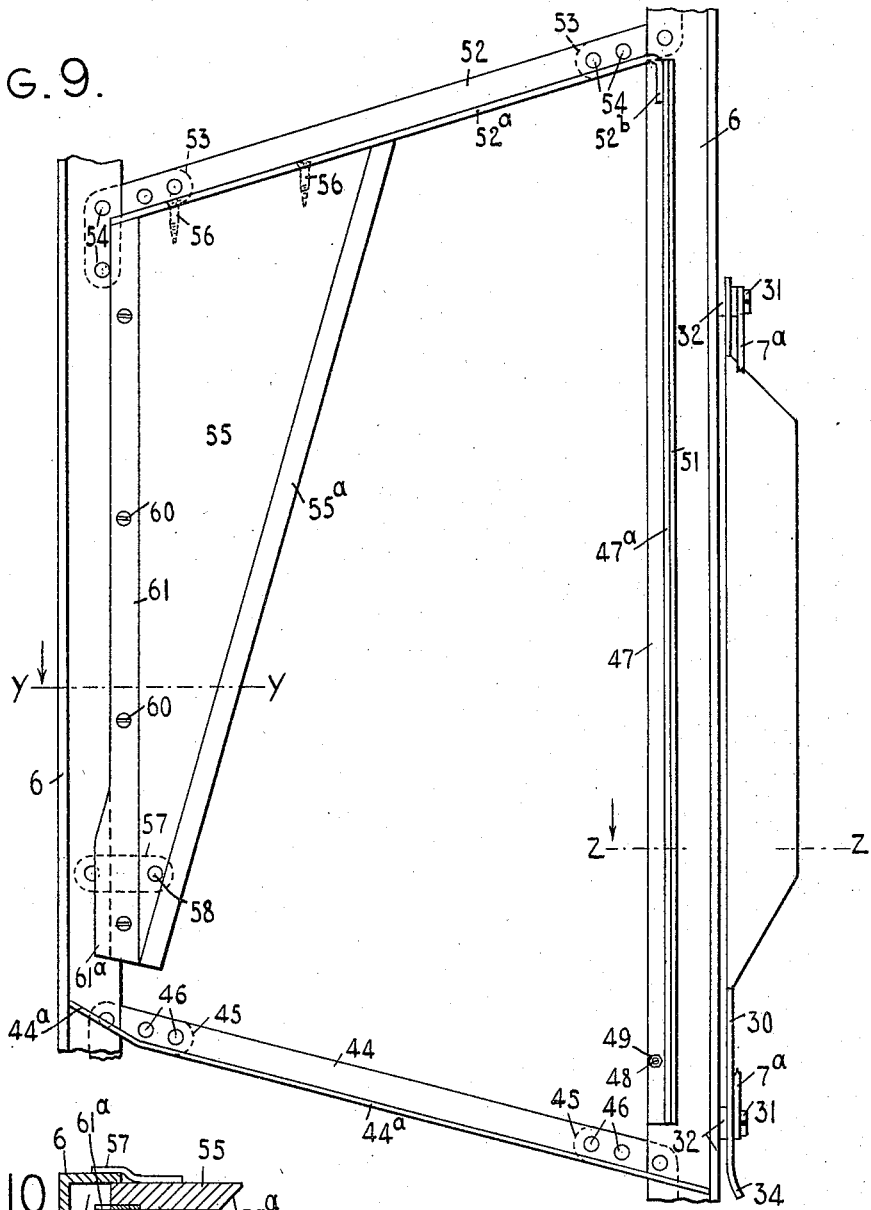

CLIO B. YAW, OF ARLINGTON, NEW JERSEY, ASSIGNOR TO REMINGTON TYPEWRITER COMPANY, OF ILION, NEW YORK, A CORPORATION OF NEW YORK.

EXHIBITING OR DISPLAYING MACHINE.

1,179,490.

Specification of Letters Patent. Patented Apr. 18, 1916.

Application filed December 11, 1913. Serial No. 805,918.

*To all whom it may concern:*

Be it known that I, CLIO B. YAW, citizen of the United States, and resident of Arlington, in the county of Hudson and State of New Jersey, have invented certain new and useful Improvements in Exhibiting or Displaying Machines, of which the following is a specification.

My present invention relates to machines, devices or apparatus for changeably exhibiting or displaying information, merchandise, etc., and the main object of the invention is to provide new and improved devices of the character specified.

To the above and other ends which will hereinafter appear, my invention consists in the features of construction, combinations of devices and arrangements of parts hereinafter described and particularly pointed out in the claims.

The preferred form of my invention is illustrated in the accompanying drawings, wherein—

Figure 1 is a fragmentary side elevation of the machine, the view showing the casing for the machine proper in vertical section. Figs. 2 and 3 are detail views of parts of the machine. Fig. 4 is a fragmentary rear elevation of the machine. Fig. 5 is a fragmentary detail view of certain parts shown in Fig. 4 drawn on a larger scale. Fig. 6 is a fragmentary side elevation, partly in section, of the upper part of the machine, the view being drawn to a larger scale than Fig. 1. Fig. 7 is a fragmentary horizontal sectional view taken on a plane indicated by the dotted line x—x in Fig. 6 and looking downward. Fig. 8 is a perspective view of a reciprocatory display receiving device or platform. Fig. 9 is an inner face view of one side of the series of track-ways or run-ways which define the path followed by the displays or exhibits in their passage through the machine. Fig. 10 is a horizontal sectional view taken on a plane indicated by the dotted line y—y in Fig. 9 and looking downward. Fig. 11 is a horizontal sectional view taken on a plane indicated by the dotted line z—z in Fig. 9 and looking downward.

As shown in Fig. 1 of the drawings, the machine is inclosed or housed in a covering or casing 1 which screens or covers it from the spectator and is detachably secured to the base 3 of the machine. The front wall 4 of the casing is provided with a display opening 5 through which the displays or exhibits may be seen. The casing is preferably open at the rear to afford ready access to the machine proper.

The supporting frame of the machine comprises the base 3 which may be of wood and which supports an open or skeletonized rectangular framework comprising four uprights or posts 6 rising from the base, these posts being preferably of angled metal, their cross section being shown in Figs. 10 and 11. At the top the posts are connected by a rectangular frame or top plate 7 which completes the supporting frame, said top plate being screwed or otherwise suitably secured in place. If found desirable the supporting frame may be strengthened or braced as by diagonal cross rods $7^a$. Two of these are shown in Fig. 4 connected by screws to the upper portions of the two rear posts and supplemented by a horizontal cross rod $7^b$. The lower portions of the two front posts may be connected by similar cross rods or braces.

Rising from the base are brackets 8 on which is mounted an electric motor or other source of power 9 (Figs. 1 and 4). The motor has a shaft 10 from which power is transmitted to the display controlling devices, said shaft constituting a driving or power shaft for the machine. To the shaft 10 is fixed near one end a sprocket wheel 11. A counter shaft 12 takes bearings in the brackets 8, said shaft being arranged parallel with the shaft 10 and having secured to it a larger sprocket wheel 13 which is connected with the sprocket wheel 11 by a belt or sprocket chain 14. At its opposite or outer end the shaft 12 carries a small sprocket wheel 15 which is connected by a sprocket chain 16 with a sprocket wheel 17 fixed to the outer left-hand end of a shaft 18 which is horizontally arranged at the rear of the main frame and takes bearings in brackets 19 screwed to the rear posts 6. The shaft 18 is the lower one of a pair of shafts of which the upper one 20 is arranged near the top of the main frame and takes bearings in brackets 21 secured to the rear posts thereof. The members comprised in at least one of the pairs of bearing brackets 19 and 21 are preferably adjustable on their supports so as to afford adjustment of the shafts 18 and 20 relative to each other. Said shafts carry each a pair of sprocket wheels 22, the corresponding members of each pair being connected by sprocket chains 23, these chains constituting parallel endless belts or devices on which are mounted the lifting or engaging devices which, together with the endless belts constitute an elevator or delivery carrier for the displays. Said devices comprise a transverse rod or shaft 24 which extends crosswise from one chain 23 to the other and is supported near its ends thereon. The end portions of said shaft are reduced in diameter as indicated at 24$^a$ and project outward through their bearings in the chains. Secured to said end portions outside the chains as by set screws 25, as best appears from Fig. 5, are engaging devices or hook members 26, the body portions whereof are at right angles to the shaft 24, said body portions terminating at their free ends in hooks proper 27. Bent outwardly at right angles from the body portions are fingers 28. Arranged on the reduced ends 24$^a$ between the hook members and the associate sprocket chains are washers 29. The set screws 25 are set so as slightly to clamp the sprocket chains between said washers and the shoulders formed on the shaft 24 by the reduced ends 24$^a$, thus causing sufficient friction to prevent free rotation of said shaft and the hook members thereon and so as to hold the hook members in positions, rotatively considered, to which they may be brought or adjusted by cooperating devices or guide ways. Said guide ways in the present instance are constituted by the rear faces of the rear posts 6 and by bars or straps 30 which are secured to said posts by screws 31 (Figs. 6 and 9). Said screws pass through washers 32 which are interposed between the posts and the straps 30, thus providing narrow passages or slot ways 33 through which the associate fingers 28 move upward. The lower end of each strap 30 is flared as indicated at 34 so as to provide mouths or pockets to insure engagement of the fingers 28 as they start to move upward at the forward side of the chains 23. It will be understood that the power is communicated from the motor 9 to the sprocket wheel 17 and the shaft 18 so as to turn said shaft in the direction of the arrow placed above it in Fig. 1, with the result that the forward sides of the chains move upward and the rear sides of said chains move downward as indicated by the arrows in Fig. 6. As the forward sides of the chains move upward carrying with them the hook members 26, the hooks 27 will be maintained substantially horizontal by the engagement of the fingers 28 with the slots 33. Thus controlled the hooks will engage and carry upward or elevate the display elements from a lower support or track-way to an upper support or track-way that is arranged above the lower track-way, these supports being hereinafter described.

The preferred construction of the display elements may best be understood from Figs. 4, 6 and 7. Each comprises a rectangular frame or holder consisting of two long parallel sides 35 and two shorter connecting parallel sides 36, the long sides being horizontally disposed when the display element is in the machine and the short sides being vertical. Diagonal corner pieces 35$^a$ may be provided to strengthen the frame and make it more rigid. The side pieces composing the rectangular frame are preferably of angular metal, thus providing a shallow skeletonized trough which is adapted to receive a card or the like. In the present instance a card 37 is provided showing an advertisement on its face. Obviously, however, other exhibits such as samples or specimens of textiles or other merchandise may be substituted. This card 37 or other exhibit is detachably maintained in place by a pair of spring clips 38 which are secured by screws 39 to the top of the frame and extend downward behind the card, pressing it forward against the inner face of the frame. A pin 40 projecting upward from the bottom of the frame may assist in maintaining the card in place. Arranged within and near the top of the frame and bearing in the side pieces 36 is a shaft 41 whose ends project outward beyond the sides of the frame and have fixed to them small wheels or rollers 42. The shaft and the wheels are rigid but may turn freely on the frame in which the shaft rotatably bears, the construction promoting even and regular movement of the display along its track-ways. Shoulders 43 on the wheels prevent undue endwise displacement of the shaft.

While I have described the form of display element which is preferred, it is to be understood that any other suitable construction may be employed and that the thing to be exhibited may be detachably mounted on the frame or other holder or may in itself alone constitute the display element. By the terms display element, display or exhibit, as hereinafter used in the claims, is to be understood anything capable of exhibition or display.

The displays are adapted to follow a path through the machine which is defined by a series of track-ways as illustrated in Figs. 1, 3, 6, 7 and 9. These track-ways comprise two which are parallel and vertically located respectively at the front and rear of the main frame and two others which are oppositely inclined and connect the vertical track-ways at the top and bottom. Each track-way comprises two parts or elements at opposite sides of the main frame. The lower track-way or support inclines from the front to the rear and comprises at each side of the machine an angled bar 44 one part of which is in a vertical plane that substantially coincides with the outer face of the main frame and the other part of which is at right angles. The last described part, indicated at 44ª provides with its associate part at the opposite side of the machine a track or support on which the rollers 42 of the displays run. The vertical portions of the members 44 terminate substantially flush with the inner edges of the front and rear posts 6 to which the members 44 are secured by angular straps 45 that are fastened by screws 46. The parts 44ª, however, are extended, as best appears from Fig. 9, across substantially the whole width of the posts 6 at the insides thereof. The rear vertical track-way is formed at each side in part by the rear posts 6 and in part by a vertical angled bar 47 secured near its lower end to the inner face of the post by a screw 48 and coöperating nut 49. The bar 47 has a portion 47ª which is parallel with one wall of the associate rear posts and provides therewith a groove or way 50. Secured to the inner face of the part 47ª is a strip or bead 51 best shown in Fig. 11 which prevents the wheels 42 from accidentally being withdrawn from the groove after they once enter the same from the bottom. It will be observed that the bar 47 terminates sufficiently far above the rear extension of the track portion 44ª to permit the rearward passage of the rollers 42. The upper track-way is inclined from the rear, forward, oppositely from the lower track-way just described, said upper track-way being likewise composed of angled bars or pieces 52 which connect the front and rear posts and are secured in place by angular straps 53 that are fastened by screws 54. The track portion proper 52ª of each bar 52 is bent downward at the rear as indicated at 52ᵇ. At the front said portion 52ª is extended slightly forward of the rear edge of the posts, leaving a space between the forward end of the part 52ª and the front wall of the associate post. Each bar 47 is adapted to turn on its screw 48 as an axis but is limited in its forward movement by the end portion 52ᵇ of the associate bar 52. The front vertical track-way or drop-way comprises two parts and is formed at each side by the front wall of the front post 6 and by a triangular plate of wood or the like 55. This triangular plate underlies the associate track 52ª and is secured thereto by wood screws 56. A strap 57 near the lower end of said plate is fastened in place by screws 58 and serves to secure the plate to the post near the bottom of the former. As best appears from Fig. 10 the front vertical face of the plate 55 coöperates with the front wall of the associate post to form a groove 59. Fixed to the inner face of the plate 55 by screws 60 is a narrow metal strip or plate 61. This strip through the greater part of its length is flush with the front face of the plate but near its lower end is extended forward partly across the groove as indicated at 61ª. The purpose of this construction will be hereinafter explained. The plate 55 and strip 61 terminate far enough above the forward extension of the portion 44ª to permit free movement of the rollers 42 downward through the passage or dropway formed by the grooves 59 and thence rearward over the downwardly inclined track-way formed by the parts 44ª.

The series of track-ways above described provide a course which is followed by each of the set or series of displays. While the number of displays may vary, of course, as found desirable, some twenty-four are shown in the present instance, these being about equally divided between the lower track-way and the upper track-way. Considering those supported on the lower trackway, it will be understood that owing to the force of gravity they tend to run down toward the rear, the rearmost one being arrested by the rear walls of the posts 6. In this position the rearmost display is adapted to be picked up by the hooks 27 of the elevator which, owing to the movement of the chain 23, will engage with the shaft 41 of said display and will lift said display upward through or along the rear vertical track-way. As the display nears the top the roller 42 at each side will engage with a transfer device which, as best illustrated in Fig. 3, comprises a bent lever 62 pivoted at 63 on a bracket 64 secured to the rear posts. A coiled spring 65 seated in a depression in said bracket coöperates with the tail of said lever to force its upper end forward, with the result that when the roller 42 contacts with said lever said roller will be forced against the wall 47ª by the pressure of the spring 65 and when the top of said wall is reached the rollers 42 will be forced by the spring pressed levers or transfer devices 62 forward on to the tracks 52ª of the upper support whereupon the display under the force of gravity will run down the track until arrested by the rearmost of the plurality of displays on the upper support.

Turning now to the foremost one of the displays on the upper support, this is prevented from dropping downward in the drop-way comprising the grooves 59 and is maintained opposite the display opening 5 for the observation of the spectator by reciprocatory restraining devices which are automatically actuated and controlled from the motor 9 through connections with the upper shaft 20. Said connections comprise, as illustrated in Figs. 1 and 4 to 7, a pinion 66 fixed to the outer right-hand end of said shaft, said pinion meshing with a large spur gear 67 that is fixed to the outer right-hand end of a shaft 68 that takes bearings in brackets 69 fixed to the rear posts 6. The gear 67 is provided with spokes and to one of these spokes is pivotally connected at 70 a forwardly extending link 71. At its front end said link is pivotally connected at 72 to a crank arm 73 fast on the outer right-hand end of a rock shaft 74 that may bear in the front posts 6. Mounted on said shaft are disks 75 provided with hubs 76 that receive set screws 77 by which the disks are secured to the rock shaft 74. These disks 75 are spaced apart on the rock shaft so as to coöperate with the tops of the displays near their ends. Each disk is notched as indicated at 78. The rock shaft 74 and disks 75 are comprised in the restraining devices. With the parts as in Fig. 6 it will be understood that the forward display is restrained or held by engagement with the forward sides of the notches 78. As the motor driven gear 67 continues to turn in the direction of the arrow (Fig. 6) the link 71 will operate to turn the crank arm 73 rearward, causing the disks 75 to turn in the direction of the said arrow, thus permitting the display to move forward under the direct influence of gravity and the pressure of the displays behind. This movement will continue until the rollers 42 of the forward display clear the track faces 52ª when the display will be free to move downward in the vertical dropway as will be understood from Fig. 2. By the time this occurs, however, the face of the disk in rear of the notch 78 has moved down into the path of the next succeeding display which is thereby held on the upper support and opposite the display opening while the released or foremost display is moving downward in the drop-way. The clips 38 have the additional function of slightly separating the displays as will be understood from Fig. 7 so that the restraining devices may carry out readily and without obstruction their combined functions of releasing one display and holding or detaining the next succeeding display. It will be understood that when the spur gear 67 has turned far enough to cause the link 71 to begin to move forward and return the crank arm 73 toward the front, the disks will turn oppositely until the notches 78 are brought opposite the foremost display on the support which will then advance until arrested by the forward side of the notches 78, whereupon the operations above described will be repeated, said display being released and permitted to descend in the drop-way in its turn. The parts are so adjusted and timed that for each display released at the front of the upper support a display will be elevated at the rear and added to the plurality on the upper support as described. As the group of displays on the upper support advance toward the front they will be accurately centered by the plates 55, the rear edges of which are beveled as indicated at 55ª to provide a flaring mouth. Also should one of the disks 75 for any reason release the foremost display at one side before the other disk releases it at the opposite side, the consequent tendency of the display to skew and possibly to wedge in the drop-way will be prevented by the extended portions 61ª of the strips 61 which extend over the grooves in the drop-way far enough to prevent the sides of the display frame from entering said grooves.

In order to prevent unnecessary jarring and possible injury of the displays and the tracks and controlling devices therefor, the displays, instead of being permitted to drop freely in the drop-way, are received on a receiving device or reciprocatory platform which is connected with the motor 9 so as to move up and down in the plane of the drop-way and is so timed that it reaches the upper limit of its movement contiguous to the bottom of the display just as the top of said display is released by the restraining devices, said platform or receiving device thereafter moving downward and supporting the display which, through the action of gravity, follows it until the rollers 42 engage the forwardly extending portion of the track elements 44ª whereupon the display will run on the lower track-way until arrested by the displays supported thereon at the time. The receiving device or movable platform with the actuating mechanism or devices therefor is illustrated in Figs. 1, 6 and 8. Said platform comprises a vertical body portion 79 having a shelf 80 bent horizontally rearward from its top, the end portions of said shelf being bent upward so as to form inclines 81, the purpose of which is to urge the supported display forward against the front side of the dropway and prevent said display from being jarred off rearward behind the platform. The outer ends of the body portion 79 are bent rearward forming ears 82 just outside the front posts 6. These posts are received in the spaces (numbered 83 in Fig. 8) between said ears and the ends of the shelf 80, and thereby serve as guides for the platform during its up and down movement. Additional guides comprise vertical guide arms or straps 84 suitably secured to the front posts 6. These straps are spaced away from the posts by washers 85, the platform being loosely confined between the posts and the straps. The platform is adapted to be reciprocated up and down automatically by the motor device through connections comprising a pinion or small gear wheel 86 which has a fixed pivot 87 on the right-hand rear post 6, said pinion meshing with the spur gear 67 (Figs. 1, 4, 6, 7). Rigid with the gear wheel 86 is a crank arm 88, to the outer end of which is pivotally connected at 89 a downwardly extending link 90. The lower end of said link is pivotally connected at 91 to a crank arm 92 fixed to the right-hand end of a rock shaft 93 and projecting forward therefrom. Said rock shaft takes bearings in angular brackets 94 screwed to the rear posts 6, and has fixed to its left-hand end a crank arm 95 corresponding to the crank arm 92. Links 96 pivotally connected to the free ends of said crank arms 92 and 95 extend upward therefrom and are pivoted at 97 to the ears 82 of the platform. Through the described connections the platform is given a reciprocatory vertical movement. In the present instance a plurality of these movements occur idly between successive releases of displays, but as has been stated the timing is such that the platform is brought to the upper limit of its movement every time a display is released by the releasing devices at the top of the drop-way. Preferably counterbalancing springs 98 surround the rock shaft 93 near its ends and are anchored at their outer ends to the brackets 94, the inner ends of said springs being secured in collars 99 on said rock shaft. These springs 98 tend to lift the crank arms 92 and 95 with the platform and connected parts, thus reducing the work of the motor in raising the parts.

After what has been said it is thought to be unnecessary further to explain the operation of the mechanism, but certain of its features may be referred to. The number of displays or exhibits may be increased or decreased as found desirable without affecting the smoothness and certainty of operation of the display controlling mechanism. Preferably about half of the displays are arranged on the lower support and half on the upper support, the elevator, delivery carrier or shifter taking the displays one at a time from the rear of the group on the lower support and adding them at the rear of the group on the upper support, while the other members of the display controlling and shifting mechanism, viz., the restraining devices and the platform, operate concurrently to take the displays one at a time from the front of the set on the upper support and deliver them at the front of the group on the lower support. When the displays successively reach the front of the group on the upper support they are detained for an appreciable time opposite the display opening in the casing. This time, of course, may be varied either by the speed of the motor or by changing the proportion and adjustment of the parts. In the present instance the time that the display is held opposite the display opening is something like eight or ten seconds but as stated this time may be lengthened or shortened as desired. In the present instance the devices for delivering the displays from one support or track-way to the other are supplemented by restraining devices which operate concurrently but are separate from and independent of the first named devices, said restraining devices becoming effective on the displays when they appear in view opposite the display opening. The display controlling devices so operate that after a display has been maintained in view for a predetermined time it is promptly withdrawn, not slowly as in some prior constructions but immediately, and at once the display opening is occupied by the next succeeding display, no time being lost, with the result that at no period is the display opening empty or unoccupied as in prior constructions, nor is there an appreciable period during which one display is gradually disappearing and the other is coming into view when the display opening is partly filled by one display and partly by the other.

Various changes may be made without departing from my invention.

What I claim as new and desire to secure by Letters Patent, is:—

1. In a machine of the character described, the combination of display controlling devices, a display comprising a rectangular frame provided at its ends with rollers, a display support with which said rollers coöperate, a vertical drop-way comprising oppositely facing grooved devices, the rollers of said display engaging in said grooves as the display moves downward after leaving said support, and plates secured to said grooved devices and partly overlying the grooves therein, said plate coöperating with the sides of said frame to prevent their entrance into the grooves and the consequent skewing of the display.

2. In a machine of the character described, the combination of display controlling devices, a display support, a vertical grooved drop-way, a platform for supporting the displays as they move along said drop-way, and a device on said platform for impelling the display toward the forward side of the grooves on said drop-way.

3. In a machine of the character described, the combination of display controlling devices, a display support, a vertical grooved drop-way, a platform for supporting the displays as they move along said drop-way, said platform comprising a substantially horizontal face and ears or inclines turned up from the rear at the ends of said face and coöperating with the bottom portion of the supported display to impel it toward the front of the drop-way and prevent it from dropping down back of the platform.

4. In a machine of the character described, the combination of a display support, a drop-way, means coöperative with the upper part of the display for controlling its passage from said support to said drop-way, and means coöperating with the bottom of the display for controlling its movement along said drop-way, the drop-way coöperating with the upper part of the display during such movement so that the display is guided both at its top and bottom.

5. In a machine of the character described, the combination of a display support, a drop-way, restraining devices coöperative with the top portion of the display to retain it on said support and subsequently to release it for passage along said drop-way, and a movable platform on which the bottom of the display rests as it moves along said drop-way, the drop-way coöperating with the upper part of the display during such movement so that the display is guided both at its top and bottom.

6. In a machine of the character described, the combination of a display, display controlling devices, a vertical drop-way, a support on which the bottom portion of said display rests during its movement along said drop-way, and a device on said support tending to move said display toward the forward side of said drop-way.

7. In a machine of the character described, the combination of a display, a drop-way, releasable means to restrain the display from movement along said drop-way, and supporting means for supporting the display during movement along said drop-way after its release, one of said means coöperating with the top of said display and the other means with the bottom of said display.

8. In a machine of the character described, the combination of a display, a display support, a drop-way, restraining means coöperative with the display to retain it on said support and subsequently to release it for passage downward along said drop-way, and a recipcocatory means for supporting said display as it moves along said drop-way, one of said means coöperating with the upper portion and the other of said means with the lower portion of said display.

9. In a machine of the character described, the combination of a screen provided with a display opening, a plurality of displays, a track-way therefor, a delivery carrier, devices for transferring said displays from said carrier to said track-way, a receiving device, and devices for controlling the transfer of said displays from said track-way to said receiving device, said last named controlling devices operating to retain said displays opposite said display opening for a predetermined time.

10. In a machine of the character described, the combination of a display, power driven belt devices, hook devices connected to be moved by said belt devices, said hook devices being operative to engage said display and move it from one place to another, and means for positively preventing said hook devices from turning relatively to said belt devices during display moving operations.

11. In a machine of the character described, the combination of a plurality of displays, two supports therefor, a pair of power driven belts spaced apart, a cross rod rotatably supported on said belts, hook devices on said cross rod and operating to engage said displays to move them from one support to the other, and means coöperating with said hooks to insure their proper position prior to engaging said displays and for positively preventing rotation of said cross rod during the display moving operations of said hooks.

12. In a machine of the character described, the combination of a plurality of displays, two supports therefor, a pair of power driven belts spaced apart, a cross rod rotatably supported on said belts, hook devices on said cross rod and operating to engage said displays to move them from one support to the other, said hook devices being provided with lateral fingers, and guide ways coöperative with said fingers during operative movements of said hooks.

13. In a machine of the character described, the combination, of a plurality of displays, two supports therefor, a pair of power driven belts spaced apart, a cross rod rotatably supported by said belts, hook devices fixed on said cross rod and operating to engage said displays to move them from one support to the other, said hook devices being provided with lateral fingers, and guide ways coöperative with said fingers during operative movements of said hooks, the ends of said guide ways being flared to insure the entrance of said hooks into said guide ways preliminary to display-moving operations.

14. In a machine of the character described, the combination of a plurality of displays, two track-ways therefor, a pair of endless belts spaced apart, means for driving said belts, a cross rod supported by said belts, and hooks on said cross rod operating to engage with said displays to move them from one track-way to the other, guiding devices for said hooks, said rod being prevented by friction from turning loosely on said belts after said hooks pass out of coöperative relationship with said guiding devices.

15. In a machine of the character described, the combination of a casing provided with a display opening; a source of power, a support within said casing; a pair of parallel shafts mounted on said support; connections between one of said shafts and said source of power; connections comprising sprocket chains and wheels between said shafts; a cross rod supported on said sprocket chains; a plurality of engaging hooks on said cross rod; upper and lower track-ways oppositely inclined mounted on said support; a plurality of displays, said hooks being adapted to lift said displays from said lower track-way to said upper track-way; restraining devices comprising a rock shaft and a plurality of notched disks; connections comprising gears and a crank and link between one of said shafts and said rock shaft, said disks operating to maintain said displays successively opposite said opening; a reciprocatory platform for controlling the downward movement of said displays from said opening; and connections between said platform and one of said shafts, said connections comprising a pinion, a crank arm, a lever, a link connecting said crank arm with said lever, and a second link connecting said platform with said lever.

Signed in the borough of Manhattan, city of New York, in the county of New York, and State of New York, this 10th day of December, A. D. 1913.

CLIO B. YAW.

Witnesses:
CHARLES E. SMITH,
M. F. HANNWEBER.

Copies of this patent may be obtained for five cents each, by addressing the "Commissioner of Patents, Washington, D. C."